US009745083B2

(12) United States Patent
Smith et al.

(10) Patent No.: US 9,745,083 B2
(45) Date of Patent: Aug. 29, 2017

(54) METHOD FOR THERMAL STABILIZATION OF A COMMUNICATIONS SATELLITE

(71) Applicant: WorldVu Satellites Limited, St Helier, Jersey (GB)

(72) Inventors: Alexander D. Smith, San Jose, CA (US); Armen Askijian, Sunnyvale, CA (US); Daniel W. Field, Sunnyvale, CA (US); James Grossman, Sunnyvale, CA (US)

(73) Assignee: WORLDVU SATELLITES LIMITED, St Helier, Jersey (GB)

( * ) Notice: Subject to any disclaimer, the term of this patent is extended or adjusted under 35 U.S.C. 154(b) by 219 days.

(21) Appl. No.: 14/676,568

(22) Filed: Apr. 1, 2015

(65) Prior Publication Data
US 2016/0288929 A1    Oct. 6, 2016

(51) Int. Cl.
| | | |
|---|---|---|
| *B64G 1/52* | (2006.01) | |
| *B64G 1/58* | (2006.01) | |
| *B64G 1/10* | (2006.01) | |
| *B64G 1/50* | (2006.01) | |
| *B64G 1/24* | (2006.01) | |
| *B64G 1/66* | (2006.01) | |
| *B64G 1/42* | (2006.01) | |

(52) U.S. Cl.
CPC .............. *B64G 1/58* (2013.01); *B64G 1/1007* (2013.01); *B64G 1/242* (2013.01); *B64G 1/50* (2013.01); *B64G 1/503* (2013.01); *B64G 1/66* (2013.01); *B64G 1/425* (2013.01)

(58) Field of Classification Search
None
See application file for complete search history.

(56) References Cited

U.S. PATENT DOCUMENTS 3,340,531 A * 9/1967 Kefalas ..................... G01S 3/42
                                                       342/353
3,742,513 A * 6/1973 Ehrenspeck ......... H01Q 19/185
                                                       343/817

(Continued)

OTHER PUBLICATIONS

Authorized Officer: Blaine R. Copenheaver, "International Search Report and The Written Opinion of the International Searching Authority", dated Jun. 27, 2016, in counterpart International PCT Application: PCT/US2016/025537, 14 pp.

*Primary Examiner* — Medhat Badawi
(74) *Attorney, Agent, or Firm* — Kaplan Breyer Schwarz, LLP

(57) ABSTRACT

A method for thermally stabilizing a communication satellite in orbit around the Earth relies on the discrete rotational symmetry of the pattern of antenna beams of the satellite. Exploiting the symmetry, the orientation of the satellite is changed from time to time by rotating the satellite through a symmetry angle of the rotational symmetry. Because of the symmetry, the beam pattern is unchanged after the rotation; but, because the rotation angle is less than 360°, a different side of the satellite is exposed to sunlight. The use of different thermal radiators and thermal shields on different sides of the satellite means that the thermal budget of the satellite is different after the rotation. By judiciously applying rotations as needed, as the orbit's orientation relative to the Sun evolves in time, it is possible to achieve effective control on the thermal budget of the satellite.

13 Claims, 5 Drawing Sheets

(56) References Cited

U.S. PATENT DOCUMENTS

| | | | | |
|---|---|---|---|---|
| 3,758,051 A * | 9/1973 | Williams | ............... | B64G 1/24 244/155 R |
| 4,707,979 A * | 11/1987 | Gutsche | ............... | B64G 1/407 60/203.1 |
| 5,439,190 A * | 8/1995 | Horstein | ............ | B64G 1/1007 244/158.4 |
| 5,642,122 A * | 6/1997 | Lockie | ................... | B64G 1/22 343/881 |
| 5,697,050 A * | 12/1997 | Wiedeman | ............. | B64G 1/24 342/354 |
| 5,794,891 A | 8/1998 | Polle et al. | | |
| 5,823,476 A | 10/1998 | Caplin | | |
| 6,073,888 A | 6/2000 | Gelon et al. | | |
| 6,082,677 A * | 7/2000 | Kikuchi | ............... | B64G 1/1021 244/158.4 |
| 6,102,335 A * | 8/2000 | Castiel | ................ | B64G 1/1007 244/158.4 |
| 6,293,502 B1 * | 9/2001 | Fowell | .................. | B64G 1/443 244/164 |
| 6,328,264 B1 * | 12/2001 | Maeda | ................ | B64G 1/1007 244/158.4 |
| 6,764,049 B1 * | 7/2004 | Maeda | ................ | B64G 1/1007 244/158.4 |
| 7,357,356 B1 | 4/2008 | Goodzeit et al. | | |
| 7,370,566 B2 * | 5/2008 | Furman | ............... | B64G 1/1085 244/158.4 |
| 7,460,063 B2 | 12/2008 | De Maagt et al. | | |
| 8,640,994 B1 * | 2/2014 | Cosner | ................ | B64G 1/1021 244/158.1 |
| 2002/0191838 A1 * | 12/2002 | Setterholm | .......... | G06T 7/0075 382/154 |
| 2005/0103941 A1 * | 5/2005 | Ebert | ...................... | B64G 1/24 244/164 |
| 2008/0136720 A1 * | 6/2008 | Parsche | ................... | H01Q 7/00 343/741 |
| 2008/0143636 A1 * | 6/2008 | Couchman | .............. | B64G 1/66 343/915 |
| 2008/0237399 A1 * | 10/2008 | Caplin | ................ | B64G 1/1085 244/158.4 |
| 2010/0179711 A1 * | 7/2010 | Munir | .................... | B64G 1/242 701/13 |
| 2012/0217348 A1 * | 8/2012 | Aguirre Martinez | | B64G 1/1021 244/158.5 |
| 2014/0097981 A1 * | 4/2014 | Celerier | ............... | B64G 1/1007 342/352 |
| 2014/0158830 A1 * | 6/2014 | Rossettini | ............. | B64G 1/242 244/158.6 |
| 2015/0217876 A1 * | 8/2015 | Halsband | ................ | B64G 1/10 244/172.6 |
| 2016/0065006 A1 * | 3/2016 | Woods | .................... | B64G 1/64 307/84 |

* cited by examiner

Polar LEO satellite orbit

Communication satellite 300 for LEO orbit

Multiple-beam pattern 400 from LEO satellite 300

Pattern of coverage areas 500 generated by satellite 300 a 90° turn leaves the pattern unchanged

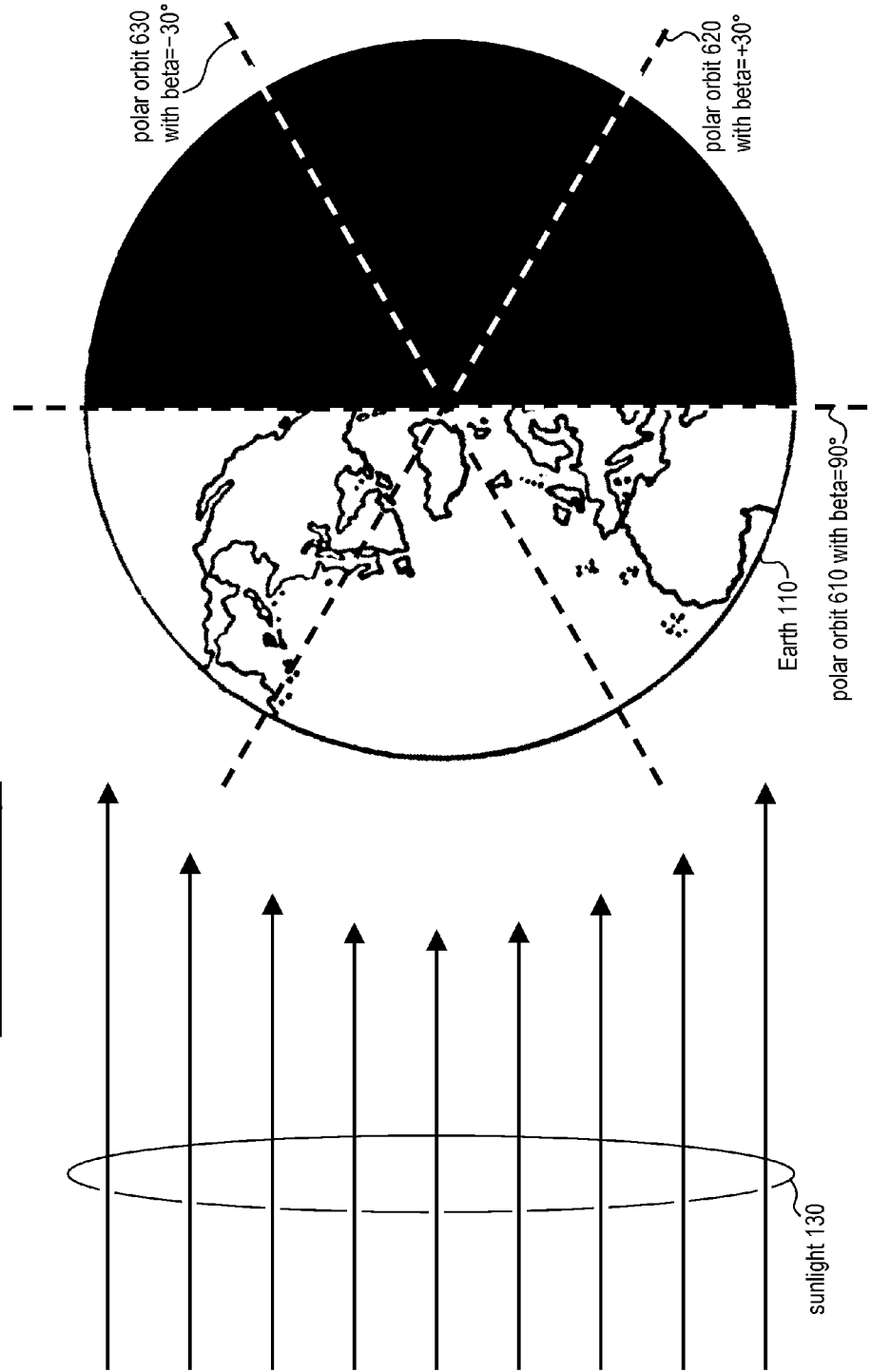

METHOD FOR THERMAL STABILIZATION OF A COMMUNICATIONS SATELLITE

FIELD OF THE INVENTION

The present invention relates to communication satellites in general, and, more particularly, to thermal management of communication satellites.

BACKGROUND

Ever since the launch of the Telstar satellite, more than fifty years ago, many artificial satellites have been launched into a variety of Earth orbits to be used as communication relay stations. Such communication satellites have achieved, through the years, great improvements in capabilities and cost, providing, in many cases, communication connectivity to regions of the Earth that are poorly serviced by other communication technologies.

The orbit of a communication satellite is usually chosen to maximize the satellite's effectiveness for communications. For example, a communication satellite might be placed in low-earth orbit (LEO) to achieve a short delay for radio communications.

FIG. 1 depicts a polar LEO orbit for a communication satellite. FIG. 1 shows an outline of planet Earth 110, with its day side 120 illuminated by sunlight 130, while the night side 140 is dark. FIG. 1 shows a possible polar LEO orbit 150 for a communication satellite. A polar orbit is understood in the art to be an orbit that passes above or near the polar regions of Earth. The particular polar LEO orbit shown in FIG. 1 can be observed to be, in part, on the night side of Earth. As a consequence, a satellite in such an orbit might be shadowed from the Sun by the Earth over portions of the orbit.

It will be clear to those skilled in the art that some satellite orbits can be exposed to sunlight over their entirety, while others can have substantial portions that lie in the Earth's shadow. This is especially true of LEO orbits. Furthermore, as the Earth goes around the Sun, the angle with which sunlight reaches Earth changes. Also, a satellite's orbit evolves; most notably, the plane of the orbit precesses around the Earth's axis of rotation. Because of these time-dependent changes, an orbit that is entirely in the Sun at some point in time, might be partly in Earth's shadow just a few months later, and vice versa.

Sunlight, of course, has the effect of heating up a communication satellite. Furthermore, the satellite comprises many components that generate waste heat, such as radio amplifiers, batteries, reaction wheels, and others. Such heat, together with heat from sunlight, must be removed in a controlled fashion, so as to keep the temperature of the satellite and its components within a desired range. The heat flow into and out of a satellite from all heat sources is referred to as the "thermal budget" of the satellite. Controlling the thermal budget is referred to as "thermal management". Most frequently, the goal of thermal management is to stabilize the temperature of the satellite or of critical satellite components.

Air is commonly used for thermal management on the surface of the Earth. For example, automobiles, computers, and many other devices are equipped with fans for cooling. Adjusting the amount of cooling provided by fans can be easily accomplished by, for example, turning fans on and off as needed: if the temperature of a device becomes too high, a fan can be turned on to move air and cool the device. When the temperature goes down, the fan can be turned off.

In space, where there is no air, cooling an object such as a satellite is more difficult. In practice, radiative cooling is the only viable option. Radiative cooling is based on the fact that warm objects emit (radiate) heat (hereinafter "radiant heat"). The warmer the object, the more radiant heat is emitted. Radiant heat is composed of electromagnetic radiation (such as light and radio waves). Indeed, the heating that an object experiences when exposed to sunlight is due to the radiant heat inherent to the sunlight. Radiant heat emissions can be exploited for thermal management of a satellite.

Satellites are usually equipped with thermal radiators. These are satellite components made to be efficient emitters of radiant heat. Because of the physics of radiant heat, thermal radiators are frequently also good absorbers of the radiant heat that comes from hot sources such as sunlight. Satellites are also usually equipped with thermal shields, which are the counterpart of thermal radiators. They are, typically, poor absorbers as well as poor emitters of radiant heat. They can be regarded as thermal insulation for spacecraft.

A satellite might be designed with a heat shield on one side and a thermal radiator on the opposite side. If the satellite is oriented such that the heat-shield side faces the Sun, while the thermal-radiator side faces empty space, radiant heat absorption from the hot sunlight is reduced, while radiant heat emission from the satellite to space is enhanced, and the satellite's temperature can be expected to fall. Conversely, if the satellite is oriented such that the thermal-radiator side faces the Sun, while the heat-shield side faces empty space, radiant heat absorption from the hot sunlight into the satellite is enhanced, while radiant heat emission from the satellite to space is reduced, and the satellite's temperature can be expected to rise. Intermediate orientations will achieve intermediate results, and the temperature of the satellite can, therefore, be controlled simply by adjusting the orientation of the satellite.

As an alternative to adjusting the orientation of the entire satellite, a satellite can be equipped with thermal radiators whose orientation can be adjusted relative to the body of the satellite. For example, the NASA Space Shuttle was equipped with large thermal panels on the inside surfaces of the cargo-bay doors. Temperature adjustments could be accomplished by adjusting the orientations of the thermal panels relative to the body of the Shuttle, and by adjusting the flow of the coolant that carried heat from various parts of the Shuttle to the thermal panels.

Many types of satellites have constraints on how they can be oriented. For example, satellites for Earth observation might be equipped with cameras or other sensors that must be aimed at the Earth's surface. Such a requirement limits the range of possible orientations of such satellites.

For communication satellites, typically, a satellite comprises one or more antennas that must be accurately aimed at regions of the Earth where communication services are to be provided. An antenna is usually characterized by how it transmits radio signals. A radio signal transmitted by an antenna propagates through space with different strengths in different directions. The geometrical shape corresponding to the spatial distribution of the propagating signal is often referred to as the "antenna beam". The use of the word "beam" reflects the shape of the geometrical shape: for the highly directional antennas commonly used on communication satellites, the geometrical shape looks very much like the beam of a searchlight. If the radio signals were visible, the antenna would look just like a searchlight.

Even antennas used as receiving antennas are characterized by an "antenna beam". This is because antennas are reciprocal devices, and, when used for receiving radio signals, an antenna exhibits different sensitivity for radio signals arriving from different directions. The geometrical shape corresponding to the spatial distribution of such varying sensitivity is the same as it would be if the antenna were used for transmission. Thus, for a receiving antenna, the "antenna beam" shows the regions of space from which signals can be received efficiently.

A communication satellite might have, for example, a single antenna with a circular antenna beam. FIG. 2 shows an example of such a satellite in a LEO polar orbit. LEO satellite 210 orbits the Earth in LEO polar orbit 150. The satellite is equipped with radio antenna 220 characterized by antenna beam 230. The conical shape that depicts antenna beam 230 represents the region of space where signals transmitted by the antenna are received with good strength. For a receiving antenna, it represents the region of space where signals can originate and be received by the satellite with good efficiency. The region of the Earth where antenna beam 230 intersects the surface of the Earth is commonly known as "coverage area" and is depicted in FIG. 2 as coverage area 230. It is the region of the Earth where satellite 210 can provide communication services through antenna 220.

In FIG. 2, the antenna beam is depicted as having circular symmetry, such that coverage area 230 is a circle. Furthermore, the antenna is aimed "straight down" meaning that the axis of circular symmetry of the antenna beam meets the surface of the Earth at right angles, and the point where it meets the surface of the Earth is the subsatellite point, shown in FIG. 2 as subsatellite point 240. An axis that goes from a satellite to the Earth and meets the surface of the Earth at right angles is commonly referred to as the "yaw" axis and is depicted in FIG. 2 as yaw axis 250. The circular coverage area 230 is centered around the subsatellite point.

Because of the circular symmetry, LEO satellite can freely rotate around the yaw axis without affecting the shape of the coverage area. Such a maneuver is known as "yaw steering" and can be advantageously used for thermal management of the satellite. The satellite can be equipped with a combination of thermal radiators and heat shields on different sides of the satellite, and can be rotated, as needed, to expose one side or another to sunlight, without affecting the shape and size of coverage area 230.

In practice, yaw steering is not an option for many communication satellites that are equipped with multiple antennas. With such satellites, radio communications occur in accordance with a geometric pattern of multiple antenna beams usually referred to as a "beam pattern" of the satellite. The beam pattern must be accurately aimed at the surface of the Earth to generate a desired pattern of coverage areas. Patterns of coverage areas are carefully designed to achieve a desired performance, and any disruption of the patterns can be very harmful. This is especially true when the satellite is part of a satellite constellation where the communication services provided by one satellite must be coordinated with the communication services provided by other satellites.

In many communication satellites, the antennas are rigidly affixed to the body of the satellite. The relative positions and relative orientations of the antennas are designed to achieve a desired beam pattern; i.e., a beam pattern which, when properly aimed at the surface of the Earth, results in a desired pattern of coverage areas. Rotation of the satellite around the yaw axis, or any other axis, is accompanied by a rotation of the beam pattern. Any substantial rotation typically results in an unacceptable distortion of the pattern of coverage areas. Therefore, thermal management through yaw steering is not an option for such satellites.

One possible solution is to use steerable antennas. Such antennas generate beams whose orientation can be adjusted. Both mechanical and electronic means for beam steering are possible. The satellite can then be rotated while the antennas are steered so as to maintain the desired beam pattern.

Another possible solution is to equip the satellite with more adaptable thermal radiators. For example, the thermal radiators might be mounted on the body of the satellite with gimbals and motors that enable them to be moved, relative to the body of the satellite. Their angle of exposure to sunlight can then be changed as needed to achieve the desired thermal management. Additionally, thermal radiators can be equipped with thermal switches that disable radiators when necessary, or with a system for circulating coolant to the panels wherein the coolant circulation pattern is made adjustable by means of valves and pumps as needed to achieve the desired thermal management.

These solutions and others available in the prior art have significant disadvantages of added cost, added satellite weight and inhibited performance. In the future, communication satellite systems with small, light, compact, low-cost satellite designs will provide a range of new services. To make such satellites a reality, a different method for thermal management is needed.

SUMMARY

Embodiments of the present invention can be used with communication satellites whose beam pattern has discrete rotational symmetry. This type of symmetry means that, while the beam pattern does not have circular symmetry, there is an axis of symmetry and there are certain angles by which the beam pattern can be rotated such that, after rotation, the new beam pattern is functionally identical to the original beam pattern. For example, the Egyptian pyramids, whose bases are perfect squares, have such symmetry. One of those pyramids can be rotated around a vertical axis by 90°, 180°, or 270° to yield an identical copy of itself.

If the beam pattern has discrete rotational symmetry, the entire satellite can be rotated by one of the symmetry angles, and the new beam pattern will be functionally identical to the original one. After rotating, the satellite can continue providing communication services to the same areas with the same performance parameters.

Of course, satellite rotation cannot be instantaneous and, while the satellite rotates by a symmetry angle, the intermediate positions can result in patterns of coverage areas that are not acceptable or do not provide adequate coverage or both. Embodiments of the present invention take advantage of two features of some satellite systems: (i) There are regions of the Earth where more satellites are available than are needed to provide coverage; and (ii) There are regions of the Earth that are so sparsely populated that a disruption of communication services there causes an acceptable impact on overall system performance. Exploiting the first feature, a satellite can perform a rotation and turn off all its communication beams while performing the rotation wherever other satellites are available to provide communication services. Exploiting the second feature, the satellite can perform a rotation with or without turning off its beams, if the associated disruption is tolerable.

Rotating the satellite exposes different parts of the satellite to sunlight and, therefore, can be used for thermal management of the satellite. In embodiments of the present invention, a satellite is equipped with different thermal radiators and/or different thermal shields on different sides of the satellite. Thermal management is achieved by judicious choices of orbital parameters, beam pattern and coordination with other satellites that enable rotating the satellite when needed to keep temperature within a desired range. Embodiments of the present invention can provide substantial reductions in the weight and cost of the thermal management subsystem of a communication satellite.

BRIEF DESCRIPTION OF THE DRAWINGS

FIG. 6 illustrates the relationship of satellite orbits with the direction of arrival of sunlight. It also illustrates how the beta angle is defined and how it evolves with time.

DETAILED DESCRIPTION

Figure 1:
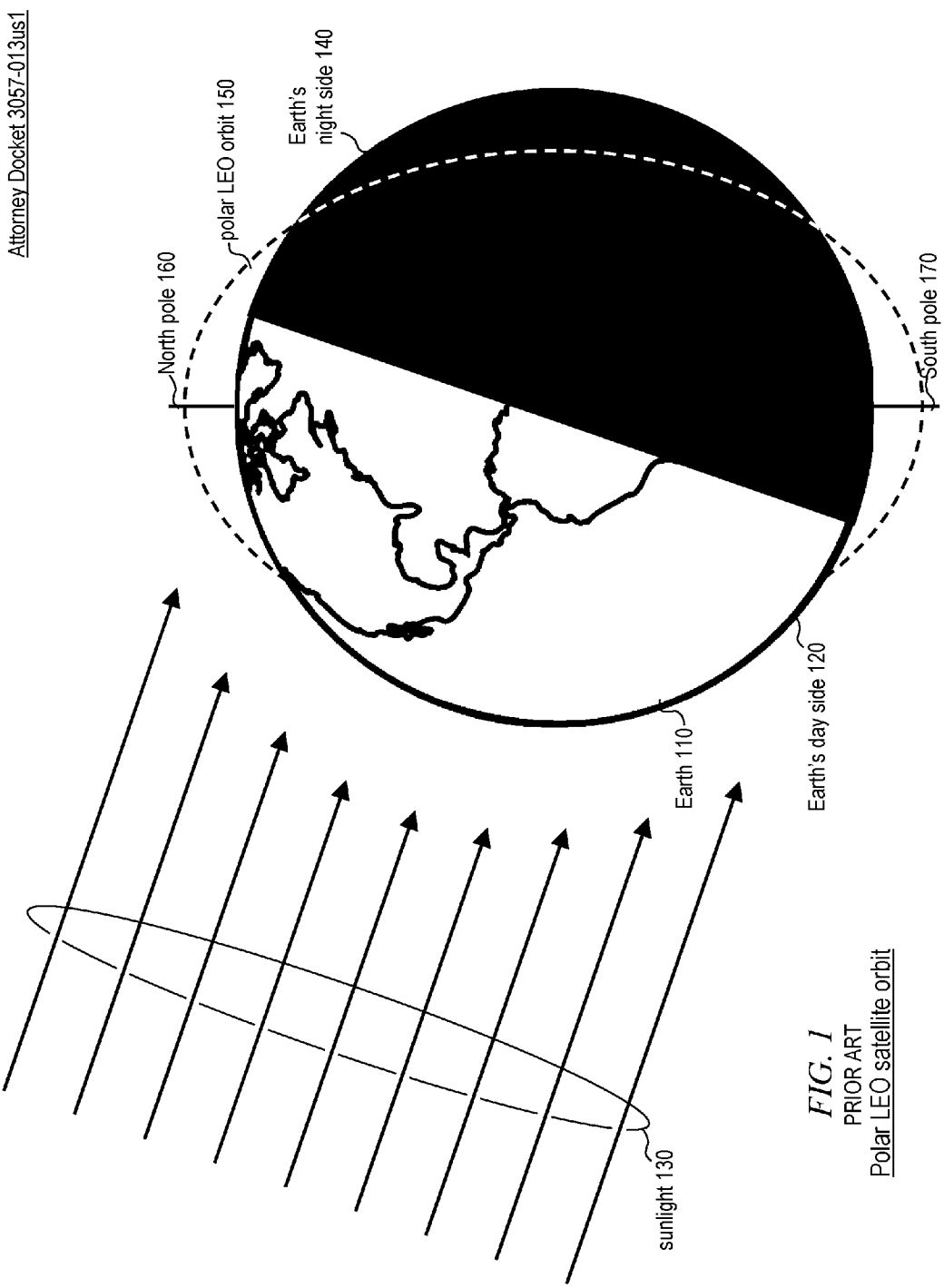
FIG. 1 depicts a polar low-Earth orbit (LEO) for a communication satellite.
Figure 2:
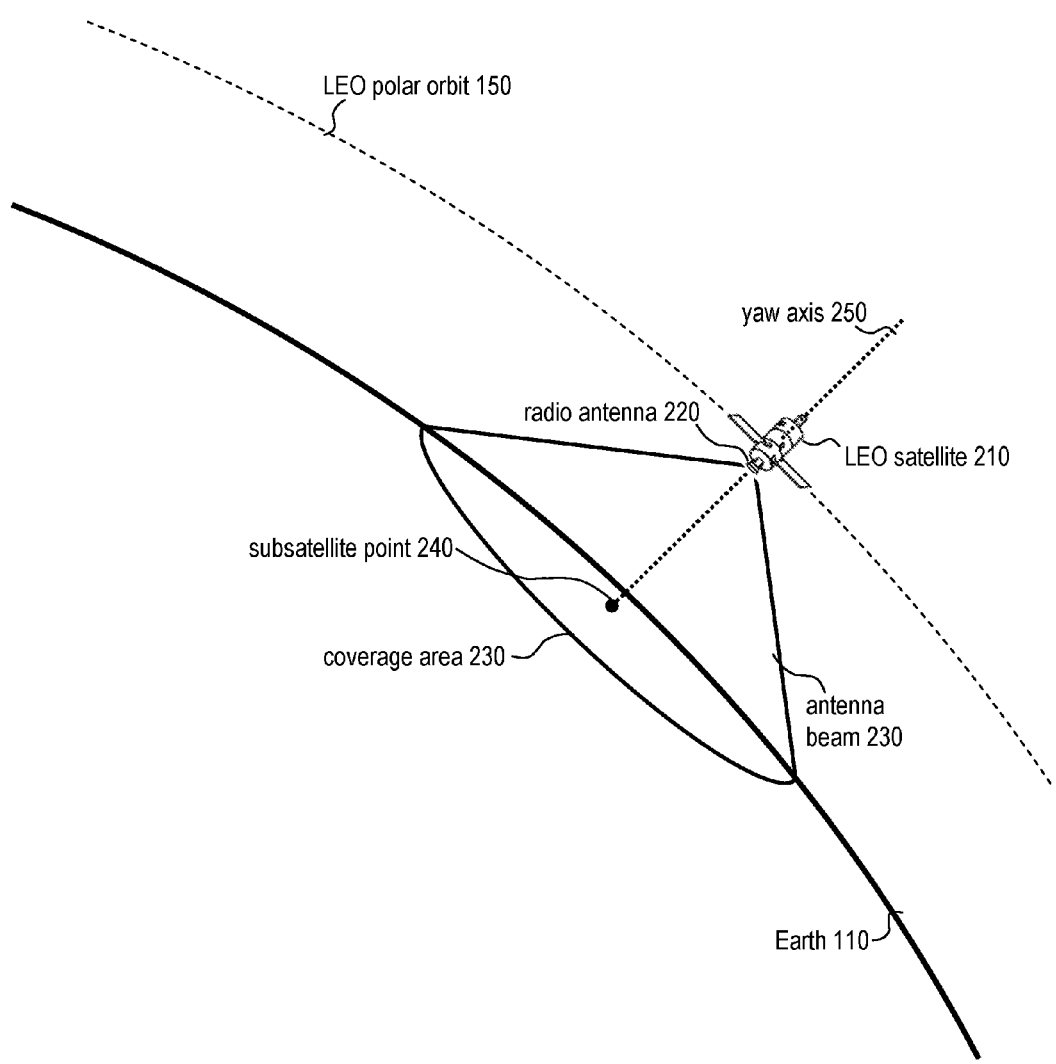
FIG. 2 depicts a communication satellite in LEO orbit. The satellite has a single communication antenna which generates an antenna beam with circular symmetry centered around the yaw axis.
Figure 3:
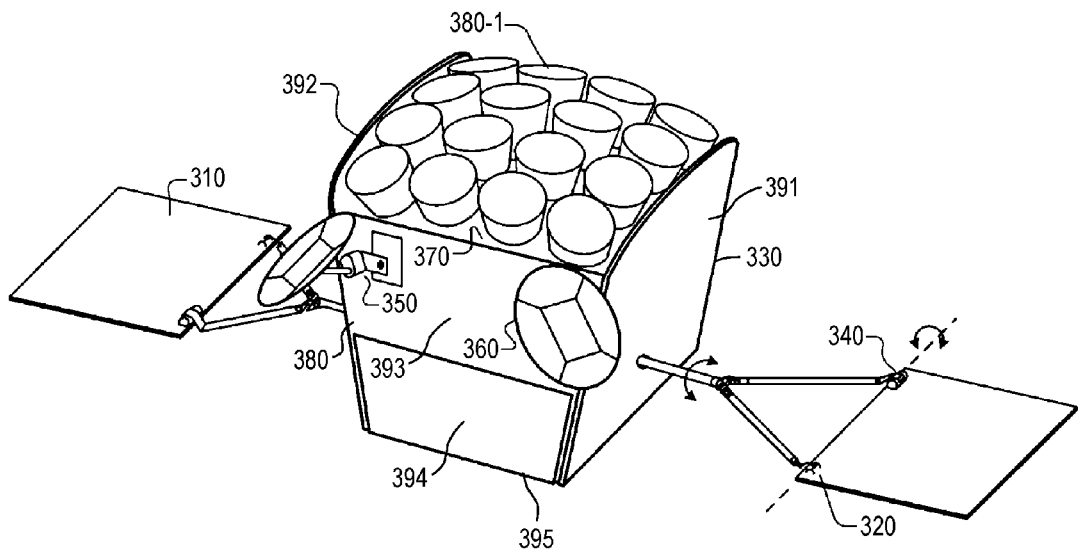
FIG. 3 depicts a communication satellite for use in a LEO orbit. The satellite has multiple communication antennas and multiple thermal radiators.

FIG. 3 depicts satellite 300 suitable for some embodiments of the present invention. The satellite is optimized for use in a LEO orbit. The satellite comprises solar panels 310 and 320 for generating electrical power from sunlight. The solar panels are hinged, such as at hinge 340, and motors are used for orienting the solar panels as needed for the panels to be exposed to sunlight. The satellite further comprises two radio antennas 350 and 360 that are also on hinged mounts and can be oriented as needed to aim at specific locations on the surface of the Earth. The satellite further comprises an array of sixteen communication antennas wherein the antennas are rigidly affixed to the body 380 of the satellite via support-web panel 370. The sixteen antennas are depicted as identical round canisters, one of them is labeled 380-1.

Figure 4:
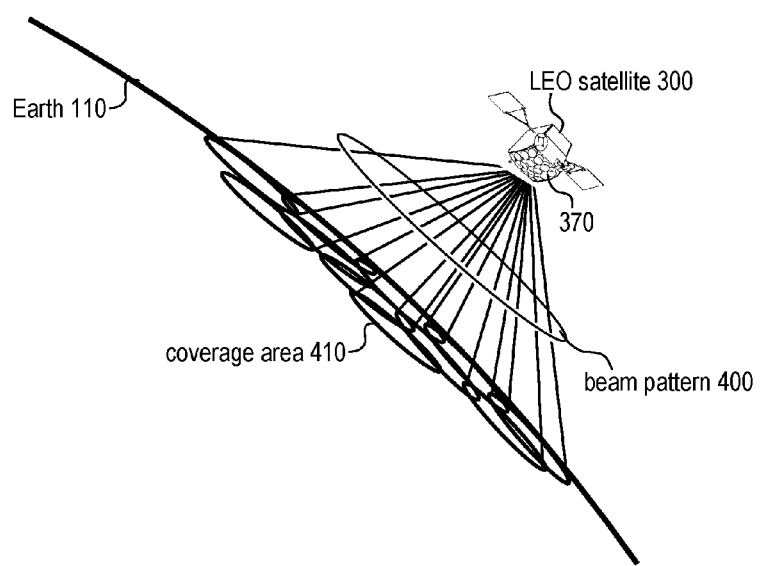
FIG. 4 illustrates the multiple-beam pattern generated by the multiple antennas of the satellite of FIG. 3.

Note that the satellite is depicted "upside down". When in orbit, the sixteen antennas are aimed at the surface of the Earth. This is illustrated in FIG. 4, where each of the sixteen antennas generates a separate antenna beam, such that the array of sixteen antennas generates a beam pattern 400 of sixteen beams. On the surface of the Earth, the beam pattern results in a pattern of sixteen coverage areas, one of which is labeled coverage area 410.

Satellite 300 further comprises five thermal radiators 391-395 on four sides of the body of the satellite. In particular, thermal radiators 391 and 392 are referred to as +Y radiator and −Y radiator, respectively, and thermal radiators 393 and 394 are referred to as +X radiator and +X-battery radiator, respectively. The remaining radiator is hidden from view in the depiction of FIG. 3; thermal radiator 395 is on the bottom side of the satellite, as depicted in FIG. 3, and is referred to as −Z radiator. The five thermal radiators are not all identical in size, capabilities and functionality. This is due, in part, to constraints of satellite design; for example, the +X-battery radiator is part of the battery module and, therefore, its primary function is to cool the battery. Other radiators are coupled to other satellite modules via heat pipes.

Satellite 300 further comprises a heat shield. It is hidden from view in the depiction of FIG. 3; it is on the bottom side of the satellite, as depicted in FIG. 3, and is labeled 330. The availability of different radiators and a heat shield on different sides of the satellite enables the satellite to take advantage of embodiments of the present invention, as will be clear to those skilled in the art after reading this disclosure.

Figure 5:
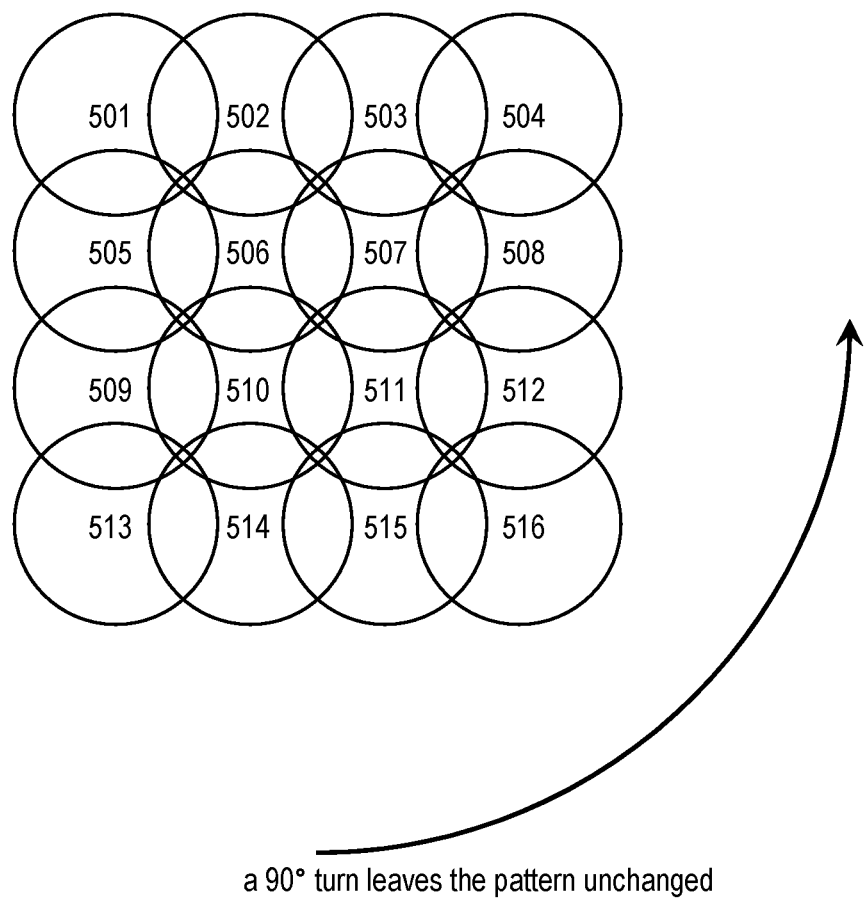
FIG. 5 depicts a pattern of coverage areas as might be generated, on the surface of the Earth, by the multiple-beam pattern of FIG. 4.

FIG. 5 depicts a pattern of coverage areas 500 generated on the surface of the Earth by satellite 300. The pattern consists of sixteen coverage areas 501 through 516. In FIG. 5, they are depicted as identical circles that overlap enough to insure that no regions are left uncovered near the boundaries between coverage areas. The pattern of coverage areas 400 can be observed to have discrete rotational symmetry.

Discrete rotational symmetry is a property of some geometrical shapes. For two-dimensional shapes, such as the pattern of geographical areas 500, the shape is said to have discrete rotational symmetry if it looks the same after rotation by some angles. The word discrete is used to distinguish this type of rotational symmetry from circular symmetry. A shape with circular symmetry looks the same after rotation by any angle; in contrast, a shape with discrete rotational symmetry looks the same only if the angle of rotation has certain values, with only a finite number of possible angle values that are greater than 0° and less than 360°. (Any shape looks the same after a rotation by 0° or 360°; it's the same as no rotation). These angle values are referred to as "symmetry angles". For the pattern of coverage areas 500, the pattern looks the same if rotated by 90°, 180°, and 270°, and these are the three symmetry angles for this shape. For the purposes of this disclosure and the appended claims, rotations by an angle that is a multiple, positive or negative, of a symmetry angle shall be deemed equivalent to a rotation by a symmetry angle.

The property of discrete rotational symmetry can also be defined for three-dimensional shapes, such as, for example, the three-dimensional beam pattern generated by antenna array 370. A three-dimensional shape is said to have the property of discrete rotational symmetry if it looks the same after rotation by some angles around an axis of rotation. The axis of rotation for which discrete rotational symmetry exists is referred to as an "axis of symmetry". As with two-dimensional shapes, there are only a finite number of possible symmetry angles greater than 0° and less than 360° for rotations around an axis of symmetry, but there can be multiple axes of symmetry. For example, a cube has multiple axes of symmetry: it can be rotated by 90°, 180°, and 270° around any axis that is parallel to one of its edges, and it will still look the same.

In the case of the beam pattern 400 generated by antenna array 370, the sixteen antennas are intentionally disposed, relative to one another, such that the beam pattern has discrete rotational symmetry with symmetry angles of 90°, 180°, and 270°. Indeed, the discrete rotational symmetry of the pattern of coverage areas 500 is a consequence of the discrete rotational symmetry of beam pattern 400, which is obtained when satellite 300 is aimed straight at the surface of the Earth, such that the axis of symmetry of the beam pattern is at right angles to the surface of the Earth.

A beam pattern with discrete rotational symmetry is advantageous because the satellite can be rotated by a symmetry angle around an axis of symmetry without resulting in a change of the beam pattern. In some embodiment of the present invention, such a satellite is rotated by a symmetry angle for the purpose of exposing different sides of the satellite to sunlight at different times, all without ever changing the beam pattern.

It should be noted that a beam pattern with discrete rotational symmetry does not necessarily generate a pattern of coverage areas that has discrete rotational symmetry. And, vice versa, it is possible to generate a pattern of coverage areas that has discrete rotational symmetry even with a beam pattern that does not have discrete rotational symmetry. For example, if satellite 300 is tilted such that the axis of symmetry of the beam pattern meets the surface of the Earth at other than right angles, the resulting pattern of coverage areas will not have discrete rotational symmetry even though the beam pattern still has discrete rotational symmetry. The property of discrete rotational symmetry of the beam pattern is intrinsic to the satellite design and is independent of how the beam pattern meets the surface of the Earth. Embodiments of the present invention can be used advantageously with satellites that generate a beam pattern with discrete rotational symmetry regardless of how the satellites are tilted or how the beam patterns meet the surface of the Earth.

In any real-world engineered system, the designers of the system set forth specifications for the performance of the system as a whole and of its subsystems. Such specifications always comprise tolerances that must be met for the system to operate as desired. This is, of course, also true of communication satellites and their coverage patterns: the parameters of the beam pattern of a communication satellite must be within certain tolerance ranges for the satellite to operate as desired. For the purposes of this disclosure and the appended claims, the beam pattern of a communication satellite is deemed to have discrete rotational symmetry if it is possible to rotate the satellite by a symmetry angle around an axis of symmetry such that both the initial and the final beam pattern meet the same design tolerances.

A full characterization of the radio signals transmitted (or received) by an antenna should include an indication of the state of polarization of the radio signals. Accordingly, one might decide to include a specification of polarization in the definition of a beam pattern. However, some radio-receiver designs are polarization agnostic (i.e., they work with any polarizations states), others are polarization-flexible (i.e., they adapt their operation as needed to work with the available polarization states), while others can only work with certain polarization states and not others. It will be clear to those skilled in the art, after reading this disclosure, how to make and use some embodiments of the present invention wherein polarization is included in the definition of discrete rotational symmetry of the beam pattern, and other embodiments wherein polarization is not included, depending on the capabilities of the radio systems. If polarization is included, a beam pattern with discrete rotational symmetry might be deemed to look the same, after a rotation by a symmetry angle, if its geometrical shape looks the same and if the pattern of polarizations of transmitted and received signals also looks the same.

In embodiments of the present invention, satellites perform a rotation around the axis of symmetry of the beam pattern from time to time. The rotation is by a symmetry angle, such that the beam pattern remains unchanged after the rotation and the satellites continue to provide communication services without disruptions or impairments. Of course, after a rotation, different antennas serve different coverage areas; however, it is well known in the art how to reconfigure channel connectivity on board the satellites, or on the ground, such that the appropriate communication channels go to the appropriate destinations.

The advantage of rotating a satellite in accordance with embodiments of the present invention stems from the fact that, while the beam pattern has discrete rotational symmetry, the pattern of thermal radiators and heat shields does not necessarily have such symmetry. Some sides of the satellite can be made more effective than others at emitting or absorbing radiant heat, and different satellite modules might also be differently coupled, thermally, with different sides of the satellite. So, for example, if the battery of satellite 300 is becoming overheated, it might be advantageous to rotate the satellite such that the +X-battery radiator 394 faces away from the Sun. Conversely, if, for example, the satellite is becoming too cold because of long time intervals spent in the Earth's shadow, it might be beneficial to rotate the satellite such that heat shield 330 faces away from the Sun, while thermal radiators 393 and 394 face the Sun, so that heat from sunlight can be absorbed more readily.

In general, the ability of rotating a satellite when needed without disruption of communication services provides embodiments of the present invention with the ability of performing thermal management of the satellite in a manner similar to prior-art yaw steering, with similar advantages, even though the satellite's beam pattern does not have circular symmetry.

It is important to note that, although the beam pattern remains unchanged after a satellite rotation by a symmetry angle, such rotation cannot be performed instantaneously. Indeed, in a typical satellite, a rotation is accomplished by adjusting the rotation rate of one or more of the reaction wheels, and the achievable rate of rotation depends on the mass of the reaction wheels involved. In most satellites, it is desirable to keep such mass as low as possible, with the consequence that the achievable rate of rotation of a typical satellite is rather low.

As the satellite transitions through intermediate angles, while performing a rotation by a symmetry angle, the beam pattern is not what it is supposed to be and the satellite's ability to provide communication services is severely impacted. Worse yet, the resulting undesired coverage pattern might cause interference problems with the coverage patterns of adjacent satellites. For this reason, in some embodiments of the present invention, some or all of the satellite's beams are turned off while the satellite goes through a rotation. Once the rotation is complete, with the satellite having rotated by a symmetry angle, the beams can be turned on again.

The disruption that occurs while a satellite is performing a rotation is acceptable, in many embodiments of the present invention, because of two features of some satellite systems: (i) There are regions of the Earth where more satellites are available than are needed to provide coverage; and (ii) There are regions of the Earth that are so sparsely populated that a disruption of communication services in such areas causes an acceptable impact on overall system performance.

The first feature is advantageous because, if there is redundant satellite coverage, one of the satellites can turn off its beams while other satellites continue to provide communication services. When a satellite needs to perform a rotation, the system can schedule such rotation for when the satellite is above one of those regions where redundant coverage is available. Then, the satellite can turn off its beams and perform the rotation while other satellites that are not performing a rotation are configured to provide communication services.

The second feature is advantageous because the cost of thermal management of a satellite by means other than an embodiment of the present invention can be very high. When designing a communication satellite system, there will be a trade-off between the advantage of performing thermal management through an embodiment of the present invention and the need to provide continuous communication services everywhere. It might turn out to be cost effective to tolerate an occasional service disruption in some sparsely populated region of Earth in return for the advantage of being able to change a satellite's thermal budget by rotating it, instead of having to equip the satellite with alternative thermal-management technology.

In some embodiments of the present invention, it might be advantageous to perform satellite rotations frequently, possibly even multiple times within an orbital period, which might be possible with a modest disruption of system performance, as discussed in the previous paragraph. In other embodiments, such rotations might be infrequent. For example, as the orientation of a polar orbit relative to the Sun changes from one month to the next, an orbit that, at some point, had extended periods of time in the shadow of the Earth might find itself to be entirely in the Sun a couple of months later. For satellites in such an orbit, it might be advantageous to perform a rotation once every few months, as needed to keep the average amount of heat received from the Sun approximately constant.

FIG. 6 illustrates one embodiment of the present invention wherein such infrequent rotations are performed. In FIG. 6, the Earth 110 is viewed form above the North Pole. Sunlight 130 arrives from the left, such that the night side of the Earth is on the right and the day side is on the left. The illumination and position of the Earth are consistent with a date of March 22 at 15:40 UT.

FIG. 6 depicts three polar orbits which, in this view, appear on edge as three straight lines 610, 620, and 630. Polar orbit 610 is aligned with the day-night terminator. A satellite orbiting along orbit 610 is always exposed to sunlight. The angle between the plane of the orbit and the direction of arrival of sunlight is referred to as the "beta angle". For this orbit 610, the value of the beta angle is 90°. The other two orbits, 620 and 630, have beta angles of +30° and −30°, respectively. Satellites in these two orbits spend a large fraction of the time in the Earth's shadow. Clearly, a satellite orientation that achieves a good thermal budget for satellites in orbit 610 is unlikely to do so for satellites in orbits 620 and 630.

FIG. 6 illustrates the fact that all polar orbits meet one another above the Earth's poles. In a satellite system based on a plurality of polar orbits, there are many more satellites above either pole, at any given time, than above any other location on Earth. Therefore, the poles are a good place for satellites to shut off their beams and perform a rotation when one is needed. Since satellites pass above one of the two poles twice in each orbit, there are plenty of opportunities for them to perform rotations. For LEO polar orbits similar to the ones depicted in FIG. 6, such opportunities come more frequently than once per hour.

As the year progresses and the direction of arrival of sunlight changes, the orbital planes of polar orbits remain pretty much stable. Therefore, the beta angles of the orbits change in response to the changing angle of arrival of sunlight. In particular, two months after the date depicted in FIG. 6, the direction of arrival of sunlight will have changed by about 60°. The sunlight will be arriving from below left, in the depiction of FIG. 6. The beta angle of orbit 620 will be close to 90°, and the entire orbit will be in sunlight. In contrast, orbit 610 will have a beta angle close to −30° and a large fraction of it will be in the Earth's shadow. Clearly, the satellite orientation that achieved a good thermal budget for satellites in orbit 610 on March 22 will no longer be a good orientation two months later. The same is true, in general, for the other orbits. In accordance with some embodiments of the present invention, satellites in orbit 610 will have performed a rotation at some point in time between March 22 and two months later, so as to maintain an orientation with a good thermal budget. In some embodiments, there might be one or more predetermined values of the beta angle at which a rotation is performed. When an orbit's beta angle reaches one of those values, a predetermined rotation is performed to achieve a different thermal budget more appropriate for the changed beta angle.

Although many of the examples in this specifications refer to polar orbits, it will be clear to those skilled in the art, after reading this disclosure, how to make and use embodiments of the present invention wherein satellite orbits are not polar. In particular, most of the statements and properties in this disclosure that are related to polar orbits are also applicable for near-polar orbits, i.e., orbits with a high inclination angle. Furthermore, many statements and properties are applicable for any LEO orbits or even other types of orbit. It will be clear to those skilled in the art, after reading this disclosure, how to make and use embodiments of the present invention that are usable with satellites that are in various types of orbits, and it will be clear to those skilled in the art, after reading this disclosure, how the concepts and methods of the present invention can be adapted to satellite systems that lend themselves to such adaptations.

It is to be understood that this disclosure teaches just one or more examples of one or more illustrative embodiments, and that many variations of the invention can easily be devised by those skilled in the art after reading this disclosure, and that the scope of the present invention is defined by the claims accompanying this disclosure.

What is claimed:

1. A method for changing the thermal budget of a communication satellite in orbit around the Earth, wherein the satellite has plural communications antennas that result in a beam pattern, the beam pattern having an axis of symmetry and possessing discrete rotational symmetry around the axis of symmetry, the method comprising rotating the satellite around the axis of symmetry of the beam pattern of the satellite, wherein the satellite is rotated by a symmetry angle of the discrete rotational symmetry.

2. The method of claim 1 wherein the satellite comprises one or more thermal radiators, and
    wherein rotating the satellite causes a change in the amount of radiant heat from sunlight received by the one or more thermal radiators.

3. The method of claim 1 wherein rotating the satellite occurs when the satellite is above a sparsely populated region of the Earth.

4. The method of claim 1 wherein the satellite is in a polar orbit, and wherein rotating the satellite occurs when the satellite is above a polar region.

5. The method of claim 4 wherein rotating the satellite occurs when the beta angle of the polar orbit reaches a predetermined value.

6. The method of claim 5 wherein the predetermined value is adjusted to reduce temperature variations on the satellite.

7. The method of claim 1 wherein the beams of the beam pattern are turned off while rotating the satellite.

8. The method of claim 1 wherein the axis of symmetry is a yaw axis.

9. The method of claim 1 wherein the symmetry angle is one of 90°, 180°, or 270°.

10. A method for controlling a temperature of a communication satellite in orbit around the Earth, the method comprising:
   monitoring the temperature;
   in response to the temperature reaching a predetermined value, rotating the satellite around an axis of symmetry of a beam pattern of the satellite;
   wherein the beam pattern has discrete rotational symmetry around the axis of symmetry, and the rotation is by a symmetry angle of the discrete rotational symmetry.

11. The method of claim 10 wherein rotating the satellite occurs after a delay has elapsed subsequent to the temperature reaching the predetermined value.

12. The method of claim 11 wherein rotating the satellite occurs when the satellite is above a sparsely populated region of the Earth.

13. The method of claim 10 wherein the beams of the beam pattern are turned off while rotating the satellite.

\* \* \* \* \*